US009575971B2

(12) United States Patent
Hampiholi

(10) Patent No.: US 9,575,971 B2
(45) Date of Patent: Feb. 21, 2017

(54) INTELLIGENT MULTIMEDIA SYSTEM

(71) Applicant: Harman International Industries, Inc., Farmington Hills, MI (US)

(72) Inventor: Vallabha Vasant Hampiholi, Bangalore (IN)

(73) Assignee: Harman International Industries, Incorporated, Stamford, CT (US)

( * ) Notice: Subject to any disclaimer, the term of this patent is extended or adjusted under 35 U.S.C. 154(b) by 139 days.

(21) Appl. No.: 13/930,034

(22) Filed: Jun. 28, 2013

(65) Prior Publication Data

US 2015/0006541 A1 Jan. 1, 2015

(51) Int. Cl.
*G06F 17/30* (2006.01)

(52) U.S. Cl.
CPC .............. *G06F 17/30053* (2013.01)

(58) Field of Classification Search
CPC .................. G06F 17/30053; G06F 17/30772; G06F 17/3074; G06F 17/30017
USPC ........................................ 707/732, 741, 913
See application file for complete search history.

(56) References Cited

U.S. PATENT DOCUMENTS

| 7,542,816 | B2 | 6/2009 | Rosenberg | |
|---|---|---|---|---|
| 2007/0244880 | A1* | 10/2007 | Martin | G06F 17/30038 707/707 |
| 2009/0240732 | A1* | 9/2009 | Amidon | G11B 27/105 707/707 |
| 2010/0228803 | A1 | 9/2010 | Quinn | |
| 2010/0312369 | A1* | 12/2010 | Dollar, Jr. | G06F 17/30749 700/94 |
| 2011/0110530 | A1* | 5/2011 | Kimura | G11B 27/00 381/86 |
| 2011/0295843 | A1 | 12/2011 | Ingrassia, Jr. et al. | |
| 2013/0305385 | A1* | 11/2013 | Korteweg | G06F 21/10 726/27 |
| 2014/0188920 | A1* | 7/2014 | Sharma | G06F 17/30775 707/758 |
| 2014/0237361 | A1* | 8/2014 | Martin | G11B 27/105 715/716 |
| 2015/0052436 | A1* | 2/2015 | DiMaria | G06F 17/30038 715/716 |

* cited by examiner

*Primary Examiner* — Robert Beausoliel, Jr.
*Assistant Examiner* — Alexandria Bromell
(74) *Attorney, Agent, or Firm* — Brooks Kushman P.C.

(57) ABSTRACT

Various embodiments relate to intelligently generating a playlist and determining attributes of a media player for output when content of the playlist is played. The playlist may be generated dynamically from content from multiple media sources and sensor information from one or more sensors communicating with the media player. The one or more attributes may also be determined from the sensors. The playlist and the attributes may change as the information from the sensors change.

15 Claims, 5 Drawing Sheets

INTELLIGENT MULTIMEDIA SYSTEM

TECHNICAL FIELD

Various embodiments relate to an intelligent multimedia device. In some embodiments, the intelligent multimedia device may use user information, location information, and/or environmental information to influence the content and the manner in which it is output.

BACKGROUND

Various different examples exist in the art for generating a playlist. For example, US Publication Number 2011/0295843 discloses a dynamic generation of contextually aware playlists. In particular, user-centric metrics are used to define and/or refine the generation of a contextually aware media playlist.

As another example, US Publication Number 2010/0228803 discloses methods and systems for merging media. In particular, the process of merging media, according to the publication, includes obtaining a first input from a first media device. The first input comprises first data corresponding to properties of one or more first media files. A second input is obtained from a second media device which comprises second data corresponding to properties of one or more second media files. A merged list is generated comprising one or more first selected media files of the first media files sharing a common property with at least one of the second media files and second selected media files of the second media files sharing the common property. One of the first selected, media files, one of the second selected media files, or both is played.

As another example, U.S. Pat. No. 7,542,816 discloses a system, method and computer program product for automatically selecting, suggesting, and playing music media files. In particular, ambient sensor signals, chronographic information, daily life schedule information, and/or external meteorological information are intelligently correlated with a user's previous music media file selection patterns for predicting future music media file play recommendations to a user of a portable media player. Music media file selection information includes user spontaneous selections of music media files and/or user acceptances or rejections of software suggested music media files. Additionally disclosed are gait matching and/or tempo adjustment in dependence on the received sensor signals and the selection, suggestion and/or automatic play of music media files.

While beneficial for their intended uses, users would also benefit from a media player that dynamically generates a playlist from multiple media sources and also changes its behavior in accordance with user behavior while playing the playlist from the media player.

SUMMARY

One aspect relates to a system for playing media. The system may include a media player (e.g., and without limitation, a portable device or a vehicle head unit) capable of playing content, one or more sensors for transmitting sensor information, and a processor. The processor may be configured to generate a playlist based on content from a plurality of media sources communicating with the media player and sensor information from one or more one or more sensors. The processor may also be configured to determine, based on the sensor information, one or more attributes of the media player for outputting the playlist from the media player. The playlist and the one or more attributes may define media experience information. Content may be output from the media player based on this media experience information.

In some embodiments, the one or more sensors may be one or more cameras. The sensor information may include a presence of a group of users based on one or more images captured by the one or cameras. The generated playlist may be a dynamically generated playlist based on a change in attributes of the group of users.

The processor may be further configured to identify a media source that is the source of the content but becomes unavailable. The processor may be further configured to identify similar content for adding to the dynamically generated playlist from one or more remaining media sources based on the unavailability of the media source.

Another aspect is a computer-program product for playing media from a media player. The computer-program product embedded in a computer readable medium may include instructions for storing media experience information for a group of users of content from one or more media sources. The media experience information may be stored as historical media experience information. The historical media experience information may include the content from the one or more media sources and one or more attributes of the media player when the content from the one or more media sources were previously played.

Further instructions include receiving sensor information from one or more sensors including information identifying the users within the group. Based on the sensor information and the historical media experience information, a media experience for the group may be determined by generating a playlist based on the content from the one or more media sources and determining one or more attributes of a media player for outputting from the media player when playing the playlist from the media player. Further instructions may include dynamically changing the media experience for the group based on a change in one or more behaviors and/or attributes of one or more users of the group.

The computer-program product may further include instructions for outputting the playlist in accordance with the dynamically changing media experience.

In some embodiments, the computer-program product further include instructions for detecting from the one or more sensors that at least one user of the group is disengaged with the content Based on detecting that a user is disengaged, the computer-program product may further include instructions for decreasing the sound level from one or more speakers of the media player during playback. The determination that at least one user in the group is disengaged with the content may be based on one or more of gesture detection or sound detection.

In some embodiments, the computer-program product further includes instructions for detecting from the one or more sensors that at least one user of the group is engaged with the content. Based on detecting that the user is engaged, the computer-program product may include instructions for increasing the sound level from one or more speakers of the media player during playback. A determination that at least one user of the group is engaged with the content may be based on detecting that the user singing or moving along with the content.

Another aspect includes a system for playing content from a media player. The system may include a processor which may be executing on a vehicle computer system. The processor may be configured to identify media sources communicating with the vehicle computing system and two or more passengers in a vehicle comprising a group of passengers. Behaviors of the passengers may be determined from sensor information received from one or more sensors communicating with the vehicle computing system. Based on the passenger behavior, the attributes of the vehicle computing system may be automatically modified for when the content is played from the vehicle computing system. The attributes of the vehicle computing system may include speaker volume and/or speaker fading. The passenger behavior may include one or more of sleeping, talking, or singing.

In some embodiments, the processor may be further configured to determine attributes of the passenger group and generate a playlist based on content from the one or more media sources, the sensor information, and the one or more attributes of the passenger group.

BRIEF DESCRIPTION OF THE DRAWINGS

The figures identified below are illustrative of some embodiments of the invention. The figures are not intended to be limiting of the invention recited in the appended claims. The embodiments, both as to their organization and manner of operation, together with further object and advantages thereof, may best be understood with reference to the following description, taken in connection with the accompanying drawings, in which:

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention. Additionally, the disclosure and arrangement of the figures is non-limiting. Accordingly, the disclosure and arrangement of the figures may be modified or re-arranged to best fit a particular implementation of the various embodiments of the invention.

There are a number of factors that may influence the content that is listened to or viewed by users. For example, a user may determine which content to listen to based on mood and/or driving conditions. When the user is in a group, and the group is listening to media together, additional factors may influence the content such as identifying content that is enjoyed by all members of the group and/or content that is appropriate for the entire group. At times, maintaining common content for the group may be challenging when the media is obtained from a single media source. For example, a media library or media database may not include genres that would be enjoyed by all members of the group, leaving one or more members possibly unsatisfied by the content that is playing. If particular content enjoyed by all is provided by one of the members of the group, who then later leaves the group, that particular content, whether it is a particular song, genre, or the like, may not then be available to the remaining members of the group.

On the other hand, selecting media from multiple media sources expands the selection options for the group, thereby increasing the possibility that all the members enjoy the content that is played even if the makeup of the group changes. For example, users in a vehicle may listen to media from satellite radio, Internet radio and a personal media player. At home, the user may have additional media sources from which to select media for play.

Figure 1:
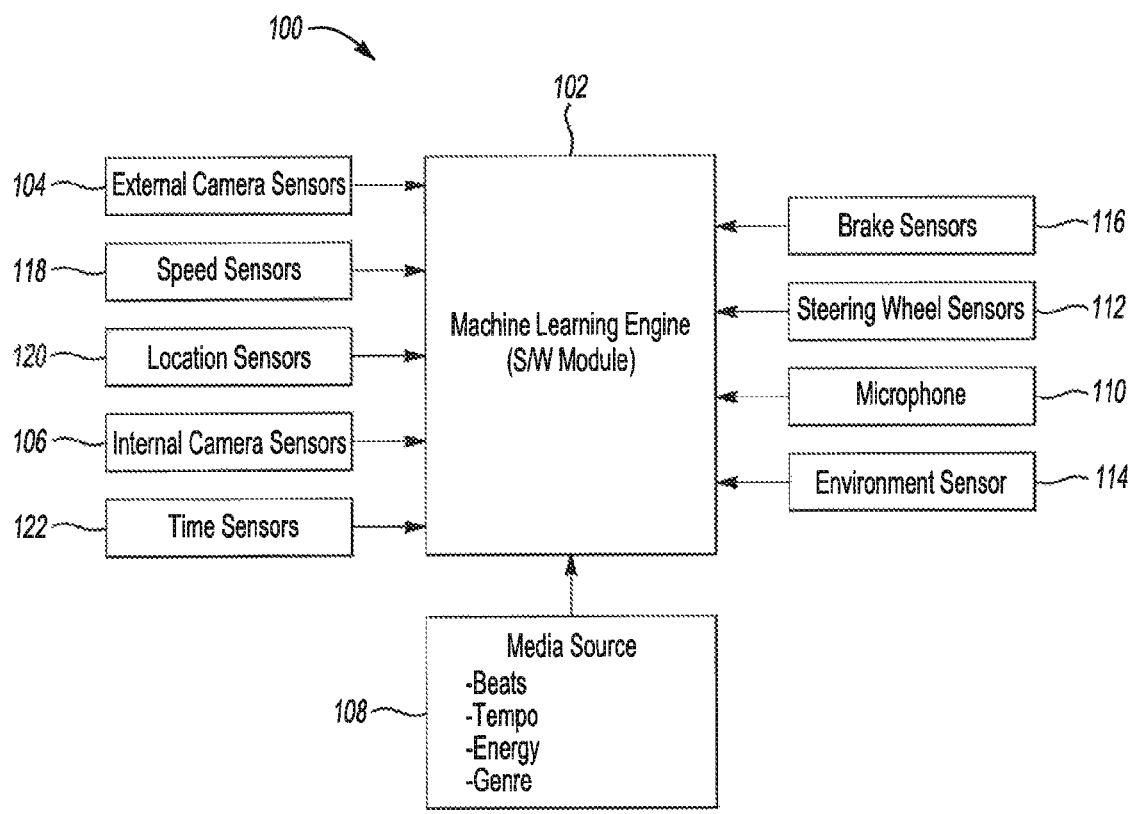
FIG. 1 illustrates a system architecture for the intelligent multimedia system.

FIG. 1 shows the architecture for an intelligent multimedia system 100 which can determine the content that is output and the manner in which it is output by a media player. For purposes of explanation and brevity, the determination of content and the manner of output by a media player will generally be referred to through this disclosure as "media experience information." The system 100 may include one or more modules (or engines) 102, which may be software based, for processing and/or executing instructions for intelligently determining the media output information. The engine 102 may comprise instructions for leaning user behaviors and preferences and storing the behaviors and preferences in memory of a device. The behaviors and preferences may be learned and stored over a period of time. The engine 102 may additionally comprise instructions for receiving and processing data from one or more sensors and components of the system 100, which will be further described below. As shown in FIG. 1, by way of example and for simplicity only, the system 100 is comprised of a single module 102 which performs the functions of the intelligent multimedia system as described in the various embodiments below. In other embodiments, the engine 102 may be one or more modules in which, for example (and without limitation), the learning module is separate from other modules of the system 100. The engine 102 may be embedded software on a device or may be software that may be transferred to and stored locally on a device (e.g., and without limitation, downloaded from the Internet and/or transferred from a portable device). Devices which may house the engine 102 may be part of a vehicle computing system (as shown, in one embodiment, in FIG. 2), an AV receiver (AVR), and/or a mobile device (e.g., and without limitation, a mobile phone or tablet). Alternatively or additionally, the engine 102 may be executing remotely on a remote server network accessible over a network connection such as the Internet, also known to one of ordinary skill as "the cloud." As shown FIG. 2 below, according to one non-limiting embodiment, the cloud-based system is network 134. In other embodiments (e.g., and without limitation, AVRs and mobile entertainment devices), communication with the cloud may be over a wired (e.g., and without limitation, Ethernet) or wireless (e.g., and without limitation, WiFi) Internet connection. Throughout this disclosure, the cloud will be interchangeably referred to as the cloud 134 or network 134.

A number of sensors and other components of the system 100 may communicate with the engine 102 to determine information about the users, events, and/or the environment. This information may include a user's behaviors and/or attributes, one or more events, and/or the attributes of the environment. Based on this information (generally referred throughout this disclosure for purposes of explanation and brevity as "experience influencing information"), the media experience information may be determined by the engine 102, in some embodiments, content selected based on the information may be output or added to a playlist. The information from the sensors, as described in further detail below, may be used individually or collectively to determine the media experience information.

Generally, the system 100 may include one or more cameras 104, microphones 110 and media sources 108. The information from these components, as determined based on user interaction with the system 100, may be transmitted to the engine 102 for determining the media experience information. In addition to specific content from the media sources 108, information relating to beat, tempo, energy, rhythm and the like may be transmitted to the engine 102. Additional details of the cameras 104 and microphones 110 are described below. Further details of the media sources 108, according to one embodiment, are described below with respect to FIG. 2.

At least one objective of the intelligent multimedia system relates to the experience for the user. In a vehicle, part of the experience includes the driving experience. Accordingly, in some embodiments, there may be additional components that communicate with the engine 102, which may be related to the user experience and the driving experience. These may include one or more cameras, such as one or more external cameras 104 and one or more internal cameras 106. The external cameras may be arranged outside of the vehicle to sense events external to the vehicle. Non-limiting examples may include traffic and braking by other vehicles. One or more internal camera sensor(s) 106 may sense user behavior and activity inside the vehicle. Non-limiting examples, as described in further detail below, may include sleeping and/or talking. In some embodiments, the camera(s) 106 may be used to detect the one or more passengers' mood through facial recognition and/or gestures.

Vehicle events may also be determined based on information received from one or more brake sensors 116. The brake sensors 116 may indicate, for example, that the vehicle is in traffic based on the amount of braking from the vehicle, the length of braking, and/or the elapsed time between braking. In some embodiments, traffic information may be determined from the brake sensors 116 and the external camera(s) 104. As one example of using braking information to determine the media experience information, soothing content may be selected by the engine 102 if it is determined that the vehicle is in traffic.

As referred to in the various embodiments of the disclosure, content is not limited to songs or music. Content may refer to any audio content including, but not limited to, news, podcasts, audio books, and the like.

Another vehicle event that may be determined is the speed of the vehicle as determined from speed sensor(s) 118. The content selected by the engine 102 may be determined based on the speed of travel as determined from the speed sensor(s) 118.

One or more microphones 110 may detect sounds within the vehicle cabin such as, and without limitation, talking between passengers and/or one or more passengers talking on the phone. As another non-limiting example, the microphone(s) may detect singing (e.g., user(s) singing along with a song, which may be used to gauge a user's engagement with the content). In some embodiments, images captured from the camera 106 may be used in conjunction with the information from the microphone(s) 110 by the engine 102 to detect activity such as talking.

In some embodiments, the type of road on which the vehicle is driving may be used in determining the media experience information. The sensors may transmit information such as steering wheel angles, rates of turn, and other like information to determine a road type. Additionally, the physiological condition of the driver may be evaluated when determining the media experience information. Such conditions may be determined from one or more steering wheel sensors 112. Sensors on the steering wheel may measure a driver's physiological condition such as, without limitation, the driver's pulse or heart rate and the driver's body temperature. Such information may be used to determine the mood of the driver, which may be relevant to the genre of media being played. As a non-limiting example of this connection, if a change to the media genre occurs, it may be because of a change in the driver's physiological state, which may be an indicator of the driver's mood. Other sensors may include a camera and/or the microphone.

Environmental conditions may also determine the media experience information. One or more environmental sensors 114 may detect environmental conditions, and the information may be transmitted as one or more messages to the engine 102 for content selection. As a non-limiting example, a sunny and warm day detected by the sensor 114 may result in a selection of upbeat content. In some embodiments, the environmental conditions may result in specific content that is directly or indirectly related to the environmental conditions being selected. As a non-limiting example of a direct relation, if it is raining, content that is about, or even mentions, rain or thunderstorms may be selected. As a non-limiting example of an indirect relation to rain, content that is about, or even mentions, a body of water may be selected. As another non-limiting example, if it is hot (e.g., above a certain temperature threshold), directly related content that is about, or event mentions, a heat wave or the sun may be selected. Non-limiting examples of indirectly related content to high temperature may include content that is about, or event mentions, beaches or swimming.

The engine 102 may also use information from location sensor 120 to determine the media experience information. As a non-limiting example, content may be selected and played at a particular volume and equalization level in accordance with how the content has historically been played by the user while travelling a particular route. As another non-limiting example, content may be selected that is associated with the city or town in which the user is driving. An association may include, but is not limited to, a band or band member's hometown, the location of a song's music video, the location of a news story, and the like. The location association may be stored as metadata associated with the content, in memory and/or in a content database (e.g., in the cloud 234).

The engine 102 may also use time information 122 to determine the content to be selected. Time may be determined from GPS information and/or a vehicle clock (not shown). As a non-limiting example, content may be selected that has historically been played by the user while travelling at a certain time.

Messages from the sensors described above may be communicated to the engine 102 through signals passed from the sensors. In a vehicle, the messages may be passed over a vehicle network. Further details of exemplary vehicle networks are described below.

Figure 2:
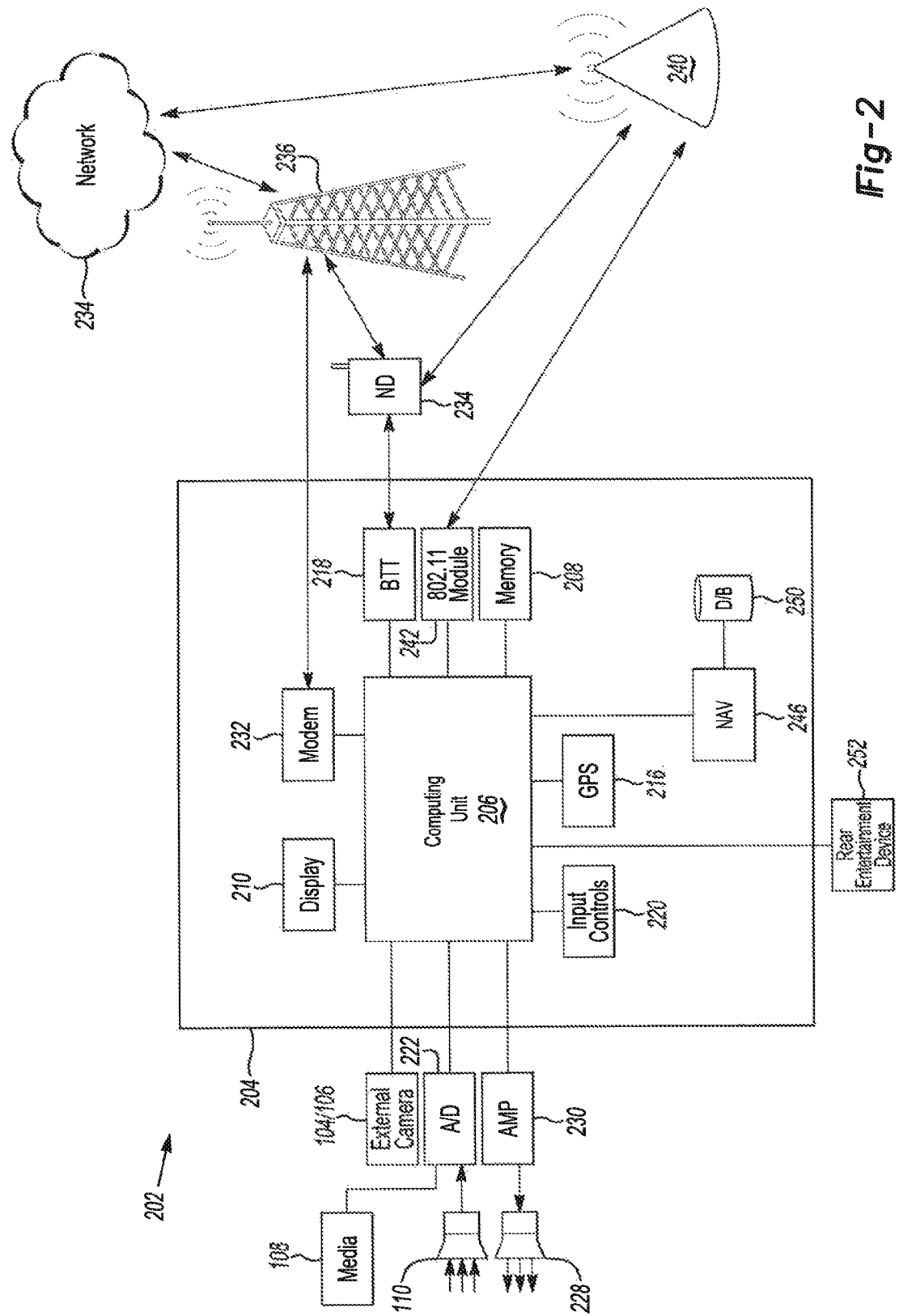
FIG. 2 illustrates a system architecture for a vehicle computing system that houses the intelligent multimedia system according to one embodiment.

FIG. 2 is a block diagram of a vehicle computing system (VCS) 202. Within a vehicle, a head unit 204 may have an onboard computing unit 206 comprised of one or more processors (not shown) that provide for on-board processing of instructions and controls received by the VCS 202. In some embodiments, the computing unit 206 may be a system on chip (SoC) construction, a system in package (SiP) construction, or a package on package construction. Non-limiting examples of SoC include ° MAP, SNAPDRAGON, and i.MX. One or more input controls 120 may also be provided to allow a user to swap between and activate various modules.

Data that may be received and processed by the onboard computing unit 206 may be stored in memory 208. The memory 208 may include non-persistent or volatile memory, such as (and without limitation) random access memory (RAM), and persistent or non-volatile memory, such as (and without limitation) a hard disk drive (HDD) or flash memory.

The head unit 204 may also include a visual front end interface, such as a display 210, located in the vehicle. The display 210 may be an LCD display or a graphical display. In some embodiments, the interface may have a touch sensitive screen. In additional or alternative embodiments, the interaction with the VCS 202 may occur through, button presses, audible speech and/or speech synthesis and displayed on display 210.

The VCS 202 is also provided with a number of different modules through which the user can interface or interact with the VCS 202. For example, the vehicle may be have one or more microphones 210, one or more media sources 108 (e.g., and without limitation, one or more media inputs, such as, and without limitation, an auxiliary input or USB input for connected devices, a radio, a CD/DVD player, satellite radio player, Internet radio player, and the like), a GPS module 216, and a BLUETOOTH module 218. Additional media sources may include one or more rear entertainment devices 252. The rear entertainment device 252 may include one or more media players (e.g., a DVD player) and one or more displays visible to rear seat passengers from which video, picture and/or audio may be output.

The computing unit 206 may be in communication with a vehicle network (not shown) that communicates data to and from the various modules. Non-limiting examples of a vehicle network include an SAE J1850 bus, a CAN bus, a GMLAN bus, and any other like vehicle data buses. The vehicle network may additionally or alternatively be a network for use with infotainment systems such as a media oriented system transport (MOST), Ethernet, or an Audio-Video Bridge (AVB) network.

The VCS 202 may also include the one or more vehicle cameras 104, 106 described above. The exterior cameras 104 may be front or rear view cameras and the interior cameras 206 may be embedded in or on, as non-limiting example, a rear view mirror, the head unit 204, and the like. Images captured by the exterior camera(s) 204 may be presented on the display 210.

Signals passing from the microphone 110 may pass through one or more analog-to-digital converters 222 before being passed to the processor 206 and vice-versa. Additionally, signals to and from some media sources 108 (e.g., AM/FM radio) may also pass through one or more A/D converters 222 before being passed to or from the onboard computing unit 206. For purposes of simplicity, one A/D converter 222 is shown. However, multiple A/D converters 222 may be arranged in the system 202.

The output from one or more vehicle modules of the VCS 202 may be audible and/or visual output. Audible output may be output from one or more in-vehicle speakers 228. The speaker(s) 228 may be connected to an amplifier 230 and may receive its signal from the processor 206. In some cases, the signals may pass through a digital-to-analog (D/A) converter (not shown). Visual outputs may be output on the display 210 and/or on one or more rear entertainment devices 252.

The vehicle may include an on-board modem 232 for two-way communication of data and messages between the vehicle and the external network 234. As a non-limiting example, modem 232 may be a USB cellular modem. As an alternative example, the modem may be an embedded modem in the vehicle. The data and messages may be exchanged by communicating with the one or more cellular towers 236.

In an additional or alternative embodiment, using a BLUETOOTH transceiver 218 in the vehicle, a communication or pairing may be made automatically with a user's portable (sometimes referred to as "nomadic") device 238 (e.g., mobile phone, smart phone, PDA, or any other device having wireless remote network connectivity) after a vehicle key-on. In some embodiments, pairing the portable device 138 and the BLUETOOTH transceiver 118 may be instructed through one or more buttons or similar input (not shown). The one or more buttons may be one or more hard keys located in the vicinity of the vehicle driver (e.g., and without limitation, on the steering wheel, in the center console, or near the display 210) and/or one or more soft keys shown on or near the display 210. The soft keys may or may not be touch-sensitive (e.g., on a touchscreen display). Additionally or alternatively, the soft keys may be one or more physical buttons mapped to the one or more soft keys.

The nomadic device 238 or onboard/embedded modem may be capable of voice band and/or broadband data communication. A user may be able to transfer data over the voice band using a technique called frequency division multiplexing. Thus, a user may be able to talk over the device while data is being transferred. If the user has a data plan associated with the nomadic device 238 or modem 232, broadband transmission may be possible.

In an additional or alternative embodiment, connectivity may be accomplished using a USB connection linking the nomadic device 238 with the head unit 204 via a USB module. In some embodiments, this connection may only be enabled using an accessory protocol. Non-limiting examples of accessory protocols include the IPHONE accessory protocol or the ANDROID accessory protocol.

Communication with the external network 234 may be accomplished through, for example, communication with a cellular tower 236 and/or a wireless access point 240. Data may be communicated from the vehicle (e.g., from the onboard computing unit 206) to the network 234 utilizing, for example, a data-plan, data over voice, or DTMF tones associated with nomadic device 238.

Additionally or alternatively, the vehicle may be outfitted with one or more wireless modules 242 for wireless communication with the network 234. A non-limiting example of such a wireless communication is any communication system meeting the 802.11 IEEE standard such as WiFi or WiMax. To communicate with the network 234, a connection may be made to a wireless hotspot 240 (or wireless access point) which may be outside and remote from the vehicle (e.g., and without limitation, at a publically available hotspot venue). In some embodiments, a wireless hotspot may be created in the vehicle and communication with the network 234 may be accomplished by wirelessly connecting one or more compatible devices in the vehicle with the in vehicle wireless access point. For purposes of simplicity and clarity, FIG. 1 shows an external hotspot 240.

Incoming data to the VCS 202 may be passed through the nomadic device 238 via a data-over-voice or data plan through the onboard BLUETOOTH transceiver 218 and into the vehicle's computing unit 206. Alternatively, the data may be passed through the embedded modem 232 to the computing unit 206. In some embodiments, data communication with the VCS 202 may be via server push messages as supported by the embedded modem. Alternatively, the data may be passed through the wireless module 242 via, e.g., a WiFi connection, to the computing unit 206. Data may be stored in the memory 208 of the VCS 202.

The computing unit 206 may be provided with an operating system including an API to communicate with modem application software. The modem application software may access an embedded module or firmware on the BLUETOOTH transceiver 218 to complete wireless communication with a remote BLUETOOTH transceiver (such as that found in a nomadic device).

A navigation module 246 may be executing on the head unit 204 for calculating and displaying navigation routes on display 210. Additionally, a navigation database 250 storing route information and map data may also be stored and executing on the head unit 204. In some embodiments, the navigation database 250 may be executing remotely the cloud 234 and communicating with head unit 204. Additional sources that may interface with the VCS 202 may include personal navigation devices and/or onboard UPS devices.

Additionally communicating with the VCS 202 may be a variety of other auxiliary devices connected through a wireless or wired connection. Auxiliary devices may include, but are not limited to, personal media players, wireless health devices, portable computers, and the like.

Additionally communicating with the computing unit 206 may be the one or more sensors as described above and illustrated in FIG. 1. Sensors may comprise interior and/or exterior sensors.

Figure 3:
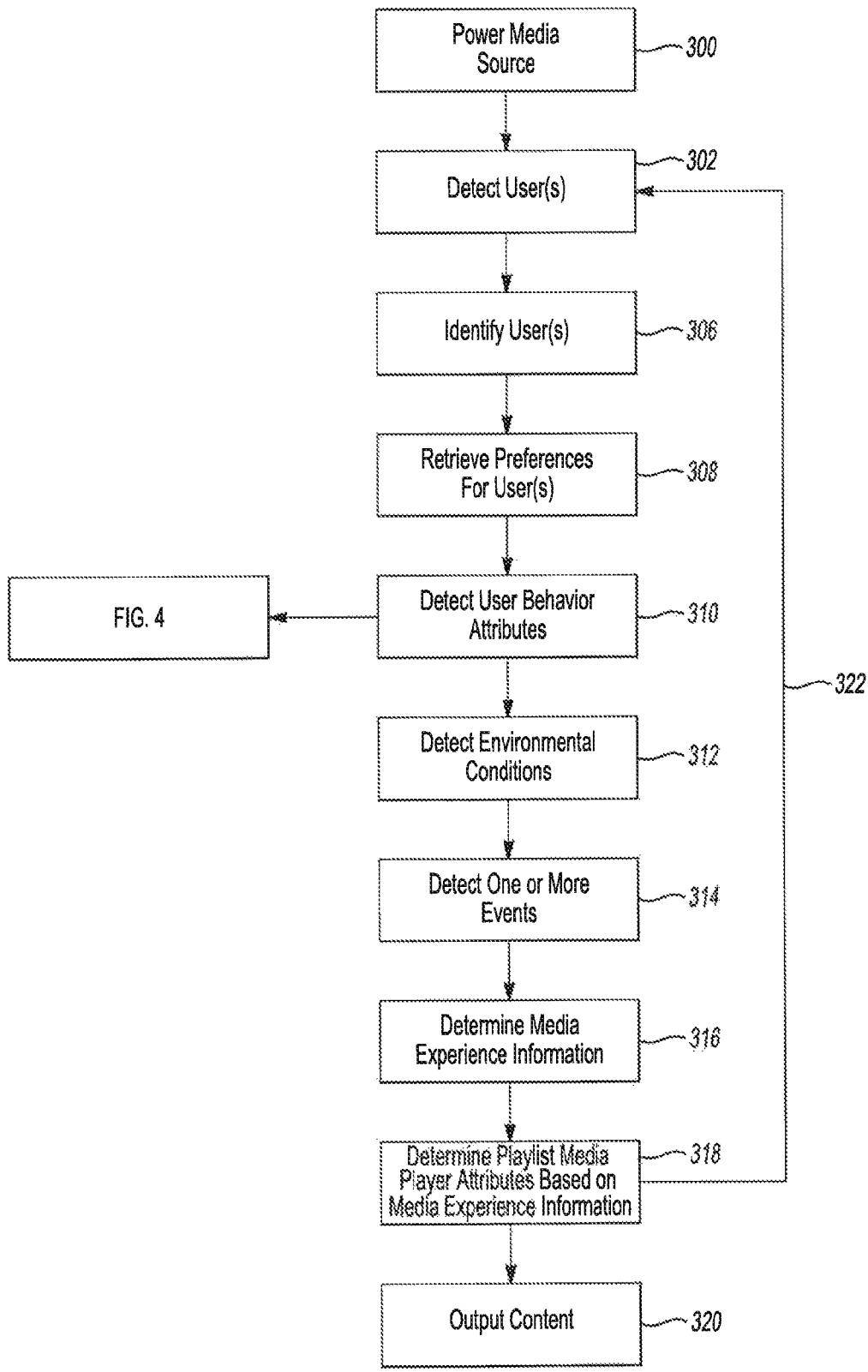
FIG. 3 illustrates a process for determining the makeup of a playlist and the corresponding attributes of the playlist.

The media experience information may cause the intelligent media system to behave differently in different circumstances. For example, a playlist in a vehicle may vary each day depending on the number of passengers in the vehicle and the experience influencing information. FIG. 3 shows the process of determining the media experience information as used in a vehicle. It should be understood, however, that the process is applicable in a non-vehicle environment as well. The determination of the media experience information by the intelligent media system occurs when one or more media sources 108 are powered (block 300). The interior camera 106 may detect the passengers (or users) in the vehicle (or in a location) (block 302). In some embodiments, the engine 102 may determine the presence of a group of users (e.g., passengers). As described below, the passengers' identity, behaviors and/or attributes may influence the determination of the media experience information. For example, a vehicle driver may have a different media listening experience when driving alone than when with children, when with passengers of the same gender, when with passengers of a different gender, or when with passengers that are sleeping.

One or more users (e.g., passengers) may be identified based on a captured image (block 306) stored in memory (e.g., locally or in the cloud 334) and each passenger's media preferences retrieved (block 308). The media preferences may include, but are not limited to, genre and artist preferences, station preferences, media source preferences, and sound preferences (e.g., volume, fading, equalization, bass, mid, treble, and the like) The preferences may be determined based on manually entered preferences and/or learned/historical behavior from the users.

To identify the passengers, the camera 106 and/or the engine 102 may be programmed with instructions for facial recognition in order to identify one or more users. Facial recognition may be accomplished according to methods known in the art.

The preferences of one or more users may be stored in profile information that may be stored locally and/or in the cloud 234. In some embodiments, the profile information may include user credentials for media sources, e.g., and without limitation, Internet radio. The profile information may also include one or more images of a user for purposes of identifying the user. Profile information may be created and stored by authorized users of the engine software 102, such as the owner of the vehicle (having the VCS 204) and/or a consumer device executing the engine 102, or someone authorized by the owner. In some embodiments, profiles may be created "on the fly" when a new user is detected (e.g., a user not having a stored profile). In this embodiment, images may be captured by the camera 106 and added to the profile or a different image may be uploaded to a profile. Information such as preference information and credentials may be input and stored from one or more of the VCS 204, a personal computer, or nomadic device. An authorized user may also selectively add users through instructions (such as a tactile or audible command) to add a new user. In some embodiments, a new user's profile information may be retrieved and/or added to the one or more profiles from a subscription based service, such as a social media site, of which the new user is a part. In some embodiments, the intelligent multimedia system may be such a subscription based service.

Once the one or more passengers are detected and identified, the media experience information may be determined by engine 102. As shown in block 310, user attributes and behaviors may be detected using the one or more sensors described above. Non limiting examples of information that may be determined includes, but is not limited to, the ages or age categories, such as adult or child, of the passengers, if one or more passengers are sleeping, if one or more passengers are talking, the heartrate of the driver, and the like.

Environmental conditions may also be detected using the one or more sensors described above for determining the media experience information (block 312). Environmental condition may detect any activity occurring outside of the vehicle. Non-limiting examples of environmental conditions include, but are not limited to, weather, traffic, road type, road conditions, and the like.

Event information as detected by the one or more sensors above may also be used to determine media experience information (block 314). The event information may relate to any events at a location that may influence the media experience for the user. Non-limiting examples include users leaving and entering a location (e.g., and without limitation a room or the vehicle), braking, vehicle speed, swerving, and the like.

Based on the determined experience influencing information described above, the media experience information may be determined by the engine 102 (block 316). A playlist, including one or more media items, may be generated and the media sources configured to output the media items of the playlist according to the manner of output defined in the media experience information (block 318). The generated playlist may be output in accordance with the manner of outputting the playlist (block 320).

As represented by loop 322, while one or more media items in the playlist are output, the engine 102 is capable of dynamically changing the media experience information. As changes to the experience influencing information occur, the media experience may change as well. As non-limiting examples, the playlist and/or the attributes of the media player when the playlist is played may change as new passengers enter or exit a vehicle, environmental conditions change, user behaviors change, and new events occur.

The content that is selected for the media experience information may be a subset of all content from one or more media sources 108 in the location. The media sources 108 may be in electrical and/or networked communication with the engine 102 (executing on the head unit 204, as a cloud based system 234 and/or an AVR). In some embodiments, the engine 102 may dynamically generate a playlist from all content that is on all connected and available media sources. In additional or alternative embodiments, the engine 102 may select content from less than all media sources 108 if, for example, the user has defined the media sources from which to select content.

One or more media sources may be owned and provided by different members of the group. The content may be selected from the different media sources for dynamically generating the playlist. If the content that is selected comes from a media source which is owned by a user who leaves the group, the remaining user should still be able to hear the content, or similar content, without reliance on the content from the departing user. Accordingly, a search may be made of other media sources to identify the same content or similar content (e.g., and without limitation, the same genre or the same or similar artists). As a non-limiting example, if a group of friends in a vehicle are listening to a song from the group "Iron Maiden," which was obtained from the media source of a friend who is departing the group, a search will be made from the other remaining media sources for that song, other songs by "Iron Maiden," or other songs in the same genre. Accordingly, a disruption to the user experience is minimized.

Below are non-limiting examples of the operation of the system. In each example, the engine 102 knows from stored information that a select group of friends listens to rock music at specific sound settings when together. For each new profile, an image of the new user is stored along with information associated with the user. Based on the behavior of the user, for example listening to an entire song, skipping a song, sleeping through a song, and the like, the information is updated in the user profile. In some embodiments, each users profile may be tagged with an identifier that identifies the shared media experience information between the friends. In additional or alternative embodiments, a group profile for the friends may be tagged with the media experience information shared between the group members.

In one non-limiting example, each time the same friends are together (whether in a vehicle or not), the system will play rock at the same sound settings. Of course, the system will continuously learn the user's preferences and behaviors such that later experiences may be different than previous experiences. As another non-limiting example, if the friends are in a vehicle and it starts raining, content may be identified, in accordance with the users' preferences, which may directly or indirectly relate to rain and may be added to the dynamically generated playlist. In another example, if the friends have left the vehicle and the user is alone, the playlist may be reconfigured according to the user's preference alone (and may also include content relating to rain, if it is still raining). Generally, content may the added to the dynamically generated playlist such that the new content is added at the end of the playlist. In some embodiments, content may be added to the playlist in accordance with a priority or a weighting of the content. Some content may be added closer to the top of the playlist (and, therefore, played sooner) than others based on the priority or weighting. The priority or weighting may be defined by the user (e.g., in preferences). For example, the user may desire to have more media items of certain genre to the added to the playlist or to play certain content more than others. The weighting may be, without limitation, a percentage (e.g., a certain percentage more of rock than other genres), a multiplier (e.g., play rock X times more than other genres), or a number (e.g., play a song X number of times in the playlist or play X number of rock songs).

In some embodiments, the priority or weighting may be automatically determined. As one non-limiting example, the determination may be made based on the one or more users' level of engagement with the content. By way of example only and not limitation, if all or most of the passenger's are singing with a particular song, then the song may be repeated in the current playlist and/or flagged to add the song at or near the top of the playlist the next time the playlist is generated. If the users are negatively engaged with a song, such as talking during the song or skipping the song, the song may be flagged to not add the song the next time the playlist is generated. In some embodiments, a threshold number of flags (or negative engagements) may occur before the song is not added to the next playlist. As another non-limiting example, if it determined that the driver is speeding, content may be added at or near the top of the playlist that may cause the driver to slow down. As another non-limiting example, if it determined that the vehicle is in traffic and the driver is getting agitated (e.g., based on physiological information or audible sounds from the driver), content that may calm down the driver may be added at or near the top of the playlist. In some embodiments, the content may replace the currently playing content.

Figure 4:
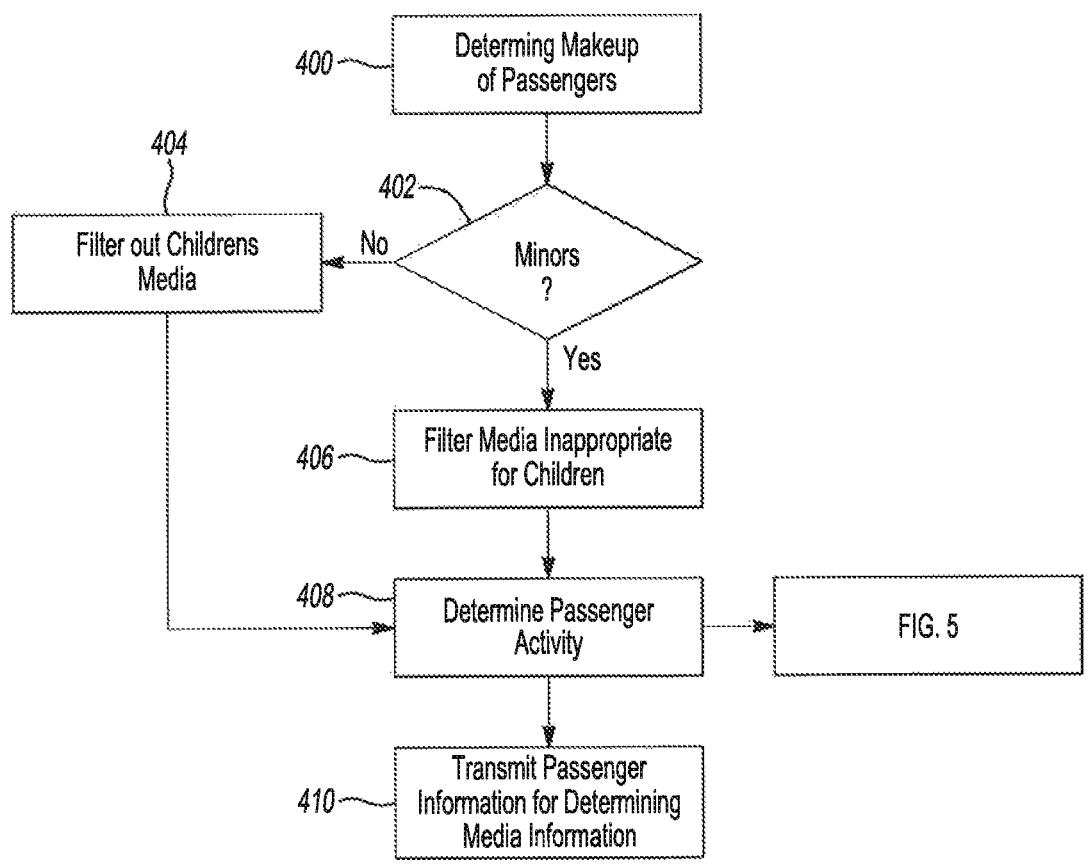
FIG. 4 illustrates a process for determining one or more user attributes and/or behaviors upon which the makeup and/or attributes of the playlist may be determined.

Further details of determining media experience information is described with respect to FIG. 4, which illustrates the process of determining media experience information based on user attributes and/or behaviors according to one embodiment. The makeup of the users may the determined based on images from the camera(s) 106 and profile information for each passenger (block 400). Based on the makeup of the passengers, certain content may or may not be excluded from the dynamically generated playlist. In the presence of minors or children, for example, content having adult themes or items that have been designated by a user as inappropriate or offensive may be excluded by the engine 102. In some embodiments, content that is inappropriate or offensive may the tagged as such by a user. In other embodiments, the designation may be in metadata of specific content. In other embodiments, the engine 102 may be programmed to review content before it is played for inappropriate or offensive content.

As a non-limiting example of the process for filtering content, FIG. 4 shows the process when minors are present (block 402). In some embodiments, the engine 102 may exclude content that may be intended for a certain listener if that listener in not present as shown in block 404. For example, engine 102 may exclude content intended for children from the dynamically generated playlist if no children are present. If children are present, inappropriate or offensive content may be excluded from the dynamically generated playlist (block 406).

In addition, the activity of the passengers may also be determined in order to further define the media experience information (block 408). Non-limiting examples of passenger activity may include sleeping, talking, and singing. The media experience information may be determined based on the experience influencing information (block 410). Further details of the operation of using passenger activity to determine media experience information is described with respect to FIG. 5.

In some embodiments, the passenger activity while content is playing may be used to determine whether to add that content to the playlist in the future and/or change the attributes of the media player the next time it plays. Based on the determination, an association may be made between the content and the passenger(s) which is used in dynamically generating the playlist. As a non-limiting example, if one or more passengers are singing with a song, an association that the song is liked may be stored between with the song and the user and/or group. As another non-limiting example, if content is skipped before or while it played, an association that the content is disliked may be stored between the content and the user and/or group. The association may be stored in a profile. In some embodiments, the determination may be based on a threshold value of the particular activity. As non-limiting examples, the number of skips or the number of times the passengers sing along with the song.

Figure 5:
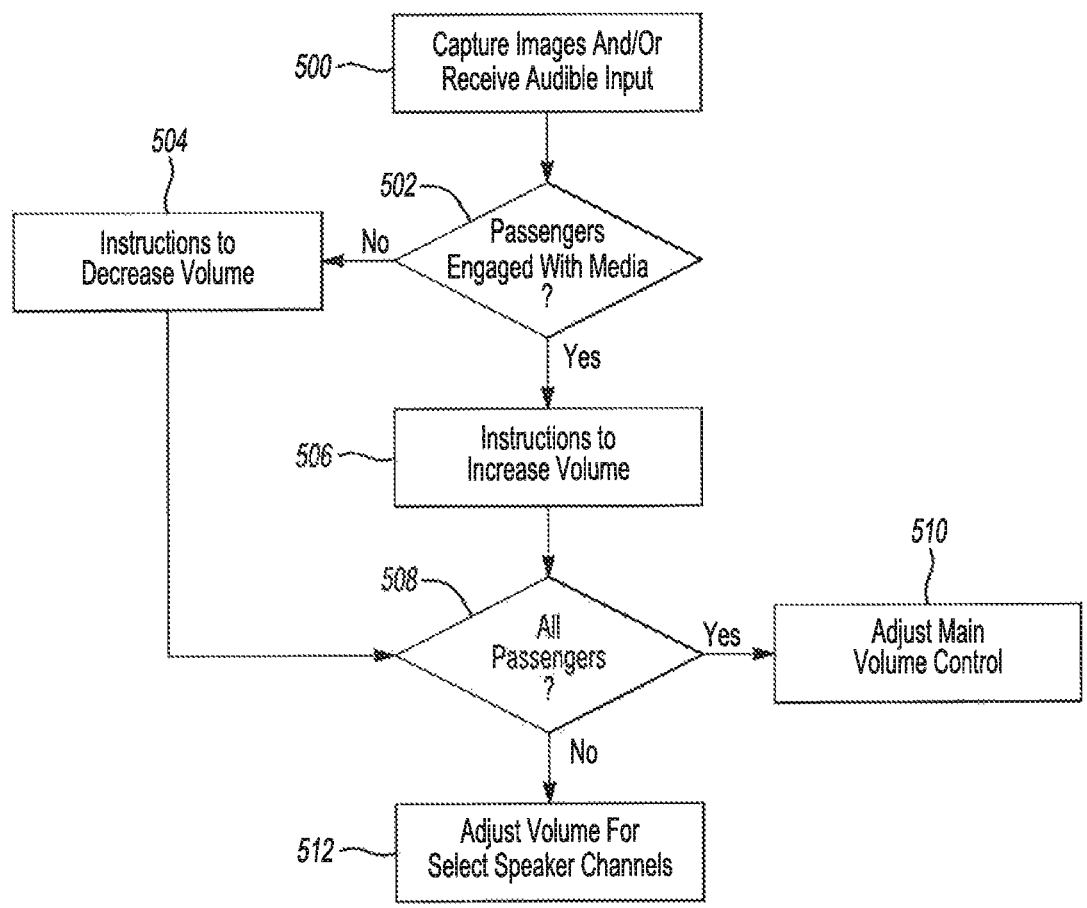
FIG. 5 illustrates an additional process for determining user attributes and/or behaviors upon which the makeup and/or attributes of the playlist may be determined.

FIG. 5 illustrates further details of the process for determining passenger activity and using the information to determine the media experience information. Passenger activity may be determined from receiving audible input via the microphone(s) 110 and/or image(s) captured by the camera 106 (block 500). In some embodiments, the microphone(s) 110 may listen for the audible input. The audible input and/or the camera images may indicate whether or not the passengers are engaged with the content playing (block 502). As a non-limiting example, the sensor information may be used to determine if the user receives a phone call and is talking while the content is playing. As another non-limiting example, the sensor information may be used to determine if one or more passengers are sleeping while the content is playing. As another non-limiting, the sensor information may be used to determine if one or more passengers are singing with a song or moving along with a song (e.g., moving a part of the body along with the beat). A digital signal processor (DSP) may be used to measure the beat from the media source, which may be transmitted to the engine 102.

If one or more passengers are determined as not being engaged with the playing content, instructions may be initiated to turn the volume of the media player down (block 504). On the other hand, if one or more passengers are determined as being engaged with the playing content, instructions may be initiated to increase the volume of the media player (block 506). In some cases, only the volume for some passengers may be adjusted since not all passengers may be involved in the same activity. For example, one passenger may be sleeping while another is singing. If it is determined that all passengers are or are not engaged with the content (block 508), then instructions may be transmitted to the main volume control to adjust the volume based on whether the passengers are engaged in the content or not (block 510). On the other hand, if only select passengers are engaged in the content and others are not engaged in the content, the volume at select speaker channels may be adjusted, which may be the speaker at or near the engaged or disengaged passenger(s) (block 512). For the engaged passengers, the volume may remain the same or increased. For passengers disengaged with the content, the volume may be decreased. The messages for controlling the sound from the speakers may be exchanged via a vehicle network, such as a CAN network. In other embodiments, it may be transmitted via a USB or serial interface. In additional or alternative embodiments, the messages may be transmitted through inter-process communication. The communication mechanism may be based on the one or more sensors that detect the behavior of the passenger(s).

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for playing media, the system comprising:
a media player capable of playing content;
one or more sensors for transmitting sensor information; and
a processor configured to:
identify a plurality of media sources communicating with the media player;
receive sensor information from the one or more sensors;
generate a playlist based on content from the plurality of media sources and the sensor information; and
based on the sensor information, determine one or more attributes of the media player for when the playlist is output from the media player, wherein the playlist and the one or more attributes define media experience information;
wherein the one or more sensors are one or more cameras and the sensor information includes a presence of a group of users based on one or more images captured by the one or more cameras;
wherein the media experience information changes as the attributes of the group of users changes;
wherein it is detected from the one or more sensors that at least one user of the group is engaged or disengaged with the content,
creating instructions for dynamically changing the media experience including instructions for increasing or decreasing the sound level from one or more speakers of the media player during playback based on the at least one user being engaged or disengaged.

2. The system of claim 1 wherein the playlist is output from the media player based on the media experience information.

3. The system of claim 1 wherein the media player is a portable device.

4. The system of claim 1 wherein the media player is a vehicle head unit.

5. The system of claim 4 wherein the playlist is a dynamically generated playlist based on changes to one or more vehicle events.

6. The system of claim 1 wherein the processor is further configured to:
identify a media source that becomes unavailable, the media source being the source of the content; and identify similar content for adding to the dynamically generated playlist from one or more remaining media sources based on the unavailability of the media source.

7. A computer-program product for playing media from a media player, the computer program product embodied in a non-transitory computer readable medium and having instructions for:
 storing media experience information for a group of users of content from one or more media sources as historical media experience information;
 receiving sensor information from one or more sensors including information identifying the users within the group;
 based on the sensor information and the historical media experience information, determining a media experience for the group by generating a playlist based on the content from the one or more media sources and determining one or more attributes of a media player when playing the playlist from the media player;
 dynamically changing the media experience for the group based on sensor information, a change in one or more behaviors and/or attributes of one or more users of the group;
 detecting from the one or more sensors that at least one user of the group is engaged or disengaged with the content, and
 creating instructions for dynamically changing the media experience including instructions for increasing or decreasing the sound level from one or more speakers of the media player during playback based on the at least one user being engaged or disengaged.

8. The computer-program product of claim 7 further comprising instructions for outputting the playlist in accordance with the dynamically changing media experience.

9. The computer-program product of claim 7 wherein the historical media experience information includes the content from the one or more media sources and one or more attributes of the media player when the content from the one or more media sources were previously played.

10. The computer-program product of claim 7 wherein the instructions for receiving sensor information include receiving the sensor information one or more cameras.

11. The computer-program of claim 7 wherein a detection that at least one user in the group is disengaged with the content is based on one or more of gesture detection or sound detection.

12. The computer-program product of claim 7 wherein a detection that at least one user of the group is engaged with the content is based on one or more of singing or movement by one or more users.

13. A system for playing content from a media player, the system comprising:
 a processor executing on a vehicle computer system configured to:
  identify one or more media sources communicating with the vehicle computing system;
  identify two or more passengers in a vehicle comprising a group of passengers; determine a first behavior of a first passenger of the passenger group from sensor information received from one or more sensors communicating with the vehicle computing system, then determine a second behavior of a second passenger of the passenger group from sensor information received from one or more sensors communicating with the vehicle computing system; and
  based on the first and second passenger behaviors, automatically modify the attributes of the vehicle computing system for when the content is played from the vehicle computing system,
  wherein the attributes of the vehicle computing system include one or more of speaker volume or speaker fading.

14. The system of claim 13 wherein the passenger behavior includes one or more of sleeping, talking, or singing.

15. The system of claim 13 wherein the processor is further configured to:
 determine one or more attributes of the passenger group; and
 generate a playlist based on content from the one or more media sources, the sensor information, and the one or more attributes of the passenger group.

* * * * *